(12) United States Patent
Clements

(10) Patent No.: US 10,286,350 B1
(45) Date of Patent: May 14, 2019

(54) COMPOSITE FILTER AND ELECTROSTATIC DISSIPATION MATERIAL

(71) Applicant: IFIL USA, LLC, Harrisonville, MO (US)

(72) Inventor: Jack T Clements, Lees Summit, MO (US)

(*) Notice: Subject to any disclaimer, the term of this patent is extended or adjusted under 35 U.S.C. 154(b) by 221 days.

(21) Appl. No.: 15/218,630

(22) Filed: Jul. 25, 2016

(51) Int. Cl.
B01D 39/16 (2006.01)
B01D 46/42 (2006.01)
B01D 46/24 (2006.01)

(52) U.S. Cl.
CPC ...... B01D 46/4209 (2013.01); B01D 46/2411 (2013.01)

(58) Field of Classification Search
CPC combination set(s) only.
See application file for complete search history.

(56) References Cited

U.S. PATENT DOCUMENTS

| | | | |
|---|---|---|---|
| 4,419,107 A | 12/1983 | Roydhouse | |
| 4,720,400 A * | 1/1988 | Manniso | B01D 46/00 427/243 |
| 5,112,677 A | 5/1992 | Tani et al. | |
| 5,221,573 A | 6/1993 | Baigas, Jr. | |
| 5,244,482 A | 9/1993 | Hassenboehler, Jr. et al. | |
| 5,350,443 A | 9/1994 | von Blucher et al. | |
| 5,527,569 A * | 6/1996 | Hobson | B01D 39/1692 428/35.2 |
| 5,626,820 A | 5/1997 | Kinkead et al. | |
| 5,759,394 A | 6/1998 | Rohrbach et al. | |
| 5,830,810 A | 11/1998 | Cohen | |
| 5,928,414 A * | 7/1999 | Wnenchak | B01D 39/1692 55/302 |
| 6,527,834 B1 * | 3/2003 | Jorder | B01D 39/2037 55/524 |
| 7,008,465 B2 * | 3/2006 | Graham | A47L 9/122 210/493.5 |
| 7,635,439 B2 | 12/2009 | Child et al. | |
| 8,545,607 B2 * | 10/2013 | Cambo | B01D 39/1692 55/486 |
| 2007/0028767 A1 * | 2/2007 | Choi | B01D 39/1692 95/59 |
| 2008/0230464 A1 * | 9/2008 | Winstrup | B01D 39/1623 210/243 |
| 2009/0266048 A1 * | 10/2009 | Schwarz | B01D 39/1692 60/39.092 |

* cited by examiner

*Primary Examiner* — Duane Smith
*Assistant Examiner* — Sonji Turner
(74) *Attorney, Agent, or Firm* — Joseph B Bowman

(57) ABSTRACT

A composite sheet material for making industrial air pollution control filters where the composite sheet material includes a porous, non-filtering, electrostatic dissipation substrate on which is bonded a thin, high efficiency filter layer. Before application of the filter layer, both sides of the porous substrate are imprinted with a pattern of spaced apart, parallel lines of conductive ink which penetrate over 50% of the substrate thickness so that the pattern on one side meets at intersections within the substrate with the pattern on the opposite side to provide a series of continuous, uninterrupted electrostatic discharge pathways running through the substrate to dissipate static electricity charges. The composite sheet material may be pleated and formed as a tube for making baghouse filter cartridges.

17 Claims, 7 Drawing Sheets

COMPOSITE FILTER AND ELECTROSTATIC DISSIPATION MATERIAL

CROSS-REFERENCE TO RELATED APPLICATIONS

This application has no related applications.

STATEMENT REGARDING FEDERALLY SPONSORED RESEARCH OR DEVELOPMENT

The inventions described and claimed in this application were not made under federally sponsored research and development.

BACKGROUND OF THE INVENTION

The present invention generally relates to a composite material for use in industrial air pollution control equipment. More specifically, the invention relates to a composite material combining a thin filter layer with a supporting substrate layer having electrostatic dissipation properties for industrial dust collection applications where extremely fine dusts may pose an explosion hazard.

Continuous emphasis on environmental quality has resulted in increasingly strenuous regulatory controls on industrial emissions. One technique which has proven highly effective in controlling air pollution has been separation of undesirable particulate matter from a gas stream by fabric filtration. Such filtration is carried out in dust collection equipment known in the trade as a "baghouse" which operates on the same general principle as an ordinary household vacuum cleaner, except on a much larger scale and the filters are cleaned on-line. Basically, the baghouse is a sheet metal housing divided into two chambers, referred to as plenums, by a metal tube sheet. Disposed within uniform openings in the tube sheet are elongate filters. A particulate laden gas stream induced by the action of a fan, flows into one chamber (dirty air plenum) wherein dust accumulates on the filter media as the gas passes through the filter into the other plenum (clean air plenum) and out an exhaust.

Although all baghouses are designed in accordance with the foregoing general principles, there are numerous operational and structural distinctions including numerous differences in the construction of the filters themselves. The present invention relates to a baghouse with uniformly sized openings in the tube sheet adapted for use with pleated cartridge filters.

A top-load baghouse refers to one for which the filter cartridges are inserted in the tube sheet openings from above the tube sheet and include various means for sealing the upper end of the filter to the tube sheet. A bottom-load baghouse refers to one for which the filter cartridges are mounted beneath the tube sheet and sealed to bag cups corresponding to the openings in the tube sheet.

A modem cartridge filter characteristically includes a central structural tube or core manufactured from a foraminous plastic or metal material. Circumscribing the central core is a tube of pleated filter media. A molded bottom cap or potted metal cap terminates the lower ends of both the core and filter media, commonly referred to as the pleat pack. The upper end of the pleat pack is terminated with an open mouthed, molded fitting sealed above or below the tube sheet as necessary. Filtration of the process gas therefore occurs from outside to inside of the filters (i.e., the dust collects on the outside surface of the pleated filter media) as the gas passes through the filter media, through the tubular core material and up to the dirty air plenum.

During continuous operation of the baghouse, the filters must be periodically cleaned and the accumulated dust removed. In a pulse-jet baghouse, cleaning is accomplished by delivering a short blast of high pressure air into the mouth of an individual filter cartridge. The higher pressure cleaning air temporarily overcomes the normal flow of process gas through the filter and travels the length of the cartridge to dislodge the dust cake accumulated on the outside of the filter pleats. The dust cake falls from the filter pleats to the hopper shaped bottom of the dirty air plenum for removal by an auger or similar means. At this point, the momentary effect of the short blast of cleaning air has dissipated and the normal flow of process gas though the cartridge filter resumes.

Many baghouse applications involve the handling of very fine dusts which can represent a serious explosion hazard. As a result, safeguards to dissipate electrostatic charges have been utilized as precautions against a static spark initiating such an explosion. Various examples of electrical grounding techniques for cartridge filters are taught in my U.S. Pat. No. 8,580,004.

In the past, others have proposed applying an electrically conductive coating directly to a filter material to aid in the discharge of electrostatic charges. As pointed out in U.S. Pat. No. 6,527,834 of Firma Carl Freudenberg, the full-surface coating of the filter media with conductive material adversely impacts the filtering characteristics of the material. Freudenberg proposed in its patent and commercially developed a filter material of nonwoven fabric coated with an electrically conductive substance applied in a reticulated or screen-like pattern. Although this solution offered the advantage over full-surface coating by opening more of the material to provide its filtering function, the conductive coating, usually applied on both sides in either a registered or unregistered pattern, still blinded or rendered inoperative a significant area of the filter material. If the reticulated pattern of conductive coating is applied on only one side, then the opposite side remains insulative and subject to potential buildup of static charges.

There remains a need in the field of industrial air pollution control for an effective material to remove micron size particular matter from process gas streams and to simultaneously provide electrostatic dissipation without blinding the filtration surface. The primary objectives of this invention are to meet these diverse needs.

SUMMARY OF THE INVENTION

More specifically, an object of the invention is to provide a composite sheet material for making industrial air pollution control filters where the composite sheet material includes a porous, non-filtering, electrostatic dissipation substrate of sufficient structural integrity to support a thin, high efficiency filter layer for removing particulate matter from a particulate laden gas stream.

Another object of the invention is to provide a composite sheet material of the character described wherein the surface of the filter layer is free of any conductive coating which tends to inhibit or blind the filtration function.

Another object of the invention is to provide a composite sheet material of the character described wherein the non-filtering, electrostatic dissipation substrate is imprinted on both sides with a pattern of spaced apart, parallel lines of conductive ink which penetrate over 50% of the substrate thickness so that the pattern on one side meets at intersections within the substrate with the pattern on the opposite side to provide a series of continuous, uninterrupted electrostatic discharge pathways running through the substrate to dissipate static electricity charges.

An addition object of the invention is to provide a composite sheet material of the character described wherein the pattern of parallel lines on one side of the substrate is oriented at a positive angle with respect to the edge of the material and the pattern of parallel lines on the opposite side of the substrate is oriented at the negative of the same positive angle so as to avoid a congruent or registered orientation from one side to the other.

A further object of the invention is to provide a composite sheet material of the character described wherein the thin filter layer is permanently bonded to the substrate layer.

Yet another object of the invention is to provide a method for making a composite sheet material of the character described.

Another object of the invention is to provide filter cartridges for top-loading and bottom-loading baghouses made from the composite sheet material of the character described wherein the composite sheet material is pleated and shaped as an elongate tube with a closed bottom end and an open upper end such that the filter layer is on the outside of the tube and the electrostatic dissipation substrate is on the inside of the tube.

An additional object of the invention is to provide a baghouse filter cartridges of the character described and having a metal core which is contacted throughout its length by the electrostatic dissipation substrate inside of the tube of the pleated composite sheet material and which, in turn, is electrically grounded to the metal tube sheet of the baghouse to prevent isolated parts that could build up a hazardous charge and to safely dissipate electrical energy.

In summary, an object of the invention is to provide a composite sheet material for making industrial air pollution control filters where the composite sheet material includes a porous, non-filtering, electrostatic dissipation substrate on which is bonded a thin, high efficiency filter layer. Before application of the filter layer, both sides of the porous substrate are imprinted with a pattern of spaced apart, parallel lines of conductive ink which penetrate over 50% of the substrate thickness so that the pattern on one side meets at intersections within the substrate with the pattern on the opposite side to provide a series of continuous, uninterrupted electrostatic discharge pathways running through the substrate to dissipate static electricity charges. The composite sheet material may be pleated and formed as a tube for making baghouse filter cartridges.

Other and further objects of the invention, together with the features of novelty appurtenant thereto, will appear in the course of the detailed description of the drawings.

BRIEF DESCRIPTION OF THE DRAWINGS

In the following description of the drawings, in which like reference numerals are employed to indicate like parts in the various views.

DETAILED DESCRIPTION OF THE DRAWINGS

Figure 1:
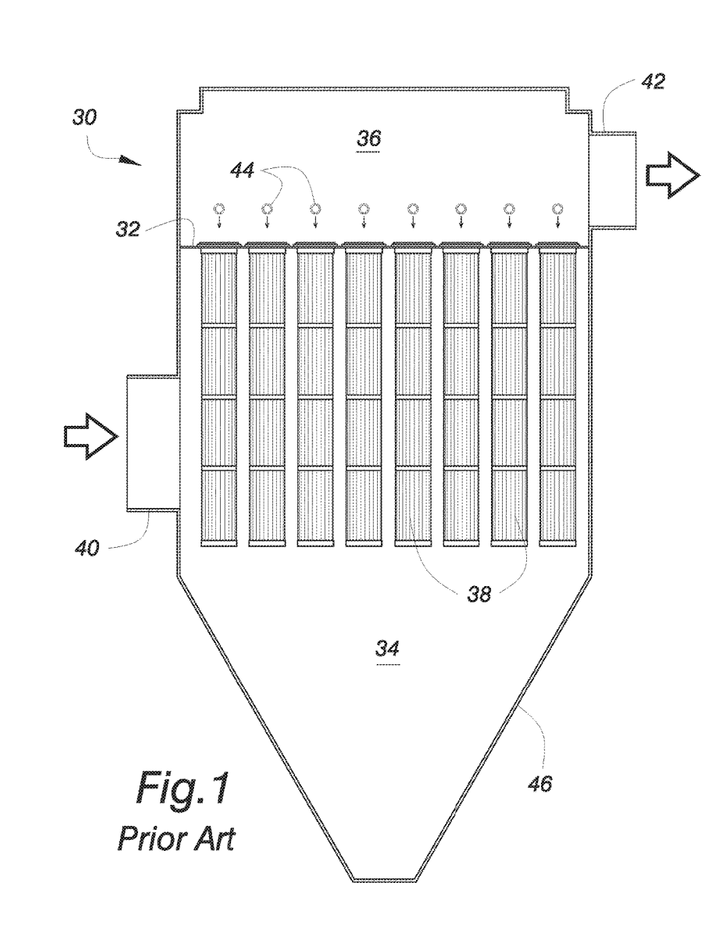
FIG. 1 is a sectional, side elevation view illustrating a conventional prior art baghouse configuration for cartridge filters.
Figure 2:
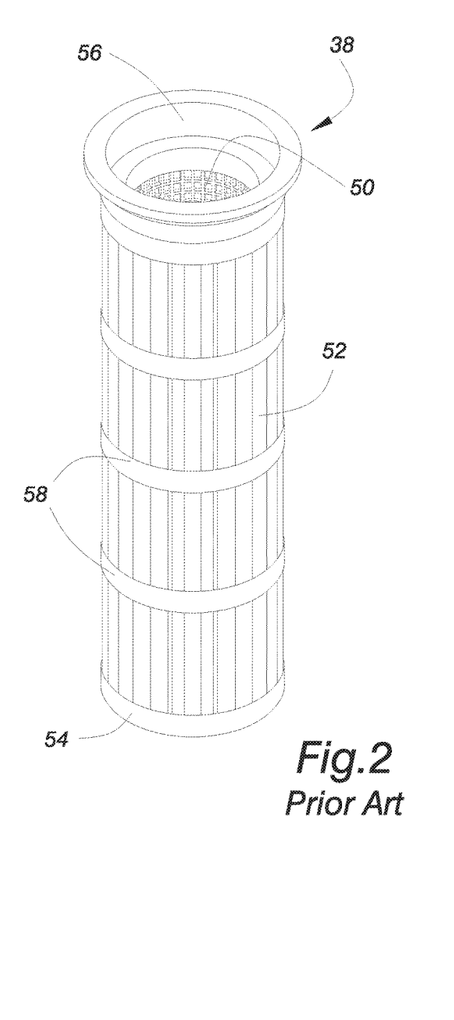
FIG. 2 is a perspective view of a circular prior art filter cartridge for use in an industrial baghouse.
Figure 3:
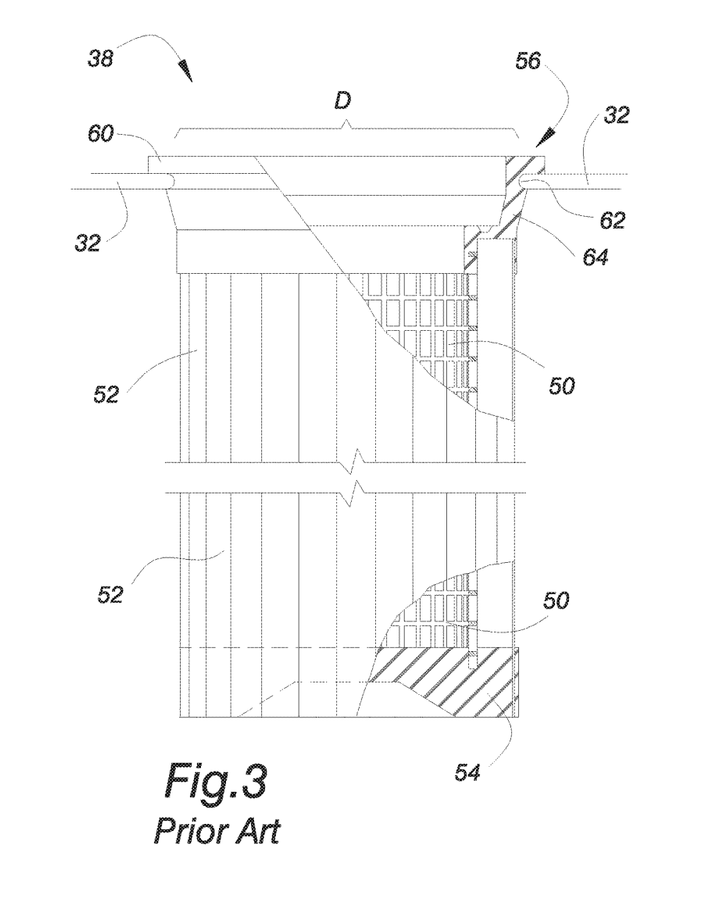
FIG. 3 is an enlarged, side elevational view, partially sectional, of the prior art filter cartridge shown in FIG. 2.

Referring to the drawings in greater detail, attention is first focused on the prior art illustrations shown in FIGS. 1 through 3 to show the typical environment for use of the composite sheet material of this invention. FIG. 1 illustrates, somewhat schematically, the major components of a top load, pulse-jet baghouse. A large sheet metal housing 30 is divided by a horizontally support tube sheet 32 into a dirty air plenum 34 and a clean air plenum 36. Vertically suspended through uniform openings in the tube sheet 32 is a plurality of pleated filter cartridges 38. Inlet ductwork 40 delivers particulate laden gas to the dirty air plenum 34. As the gas passes through the filter cartridges 38 and into the clean air plenum 36, dust accumulates on the exterior surface of the filters 38. The scrubbed process gas is discharged from the clean air plenum 36 through an exhaust duct 42 to the atmosphere or to additional processing such as heat recovery equipment (not shown).

Positioned in the clean air plenum above the rows of filters 38 are high pressure blow pipes 44 with orifices registering above the mouths of the filters 38. As dust builds up, the filter cartridges 38 must be periodically cleaned. This is accomplished by delivering a short blast of high pressure air to one or more rows of the filters 38. The high pressure air blast enters the mouth of the filter 38 and travels the length of the pleated media to dislodge any accumulated dust cake from the exterior surface of the filters 38. That dislodged dust falls by gravity into the hopper shaped section 46 of the baghouse 30 where it may be subsequently removed by an auger or similar equipment (not shown). Those filters 38 or rows of filters 38 not being subjected to the high pressure cleaning air cycle remain in normal filtering service.

A typical prior art, cylindrical top-load filter cartridge 38 is illustrated in FIGS. 2-3 for application in uniform circular holes of a baghouse tube sheet 32. The cartridge 38 includes a central cylindrical core 50 often formed by foraminous plastic or metal. Circumscribing the central core 50 is a cylindrical ring of pleated filter media 52. The combination of the pleated filter media 52 supported on the core 50 is commonly referred to as the pleat pack. A molded or potted metal end cap 54 sealingly closes the lower ends of both the core 50 and filter media 52 of the pleat pack.

The upper end of the pleat pack is terminated with an open mouthed, molded or metallic top fitting 56, the details of which as best seen in FIG. 3. Between the top fitting 56 and the bottom end cap 54 are retaining bands 58, shown in FIG. 2, spaced apart along the length of the filter cartridge 38. The retaining bands 58 serve to limit flexure of the pleated filter media 52 during a cleaning cycle.

The top fitting 56 has an upper annular flange 60 with an outer diameter greater than the hole diameter D in the tube sheet 32. The inside diameter of the flange 60 is less than the hole diameter D in the tube sheet 32 and forms the opening of the mouth into the filter cartridge 38. Immediately beneath the flange 60 is a groove 62 formed in the side of the top fitting 56. The groove 62 is sized to substantially conform to the shape and diameter of the hole diameter D in the tube sheet 32 in order to seal therewith when the filter cartridge 38 is installed as shown. The lower portion 64 of the top fitting 56 receives the upper ends of the core 50 and the filter media 52 of the pleat pack.

Figure 4:
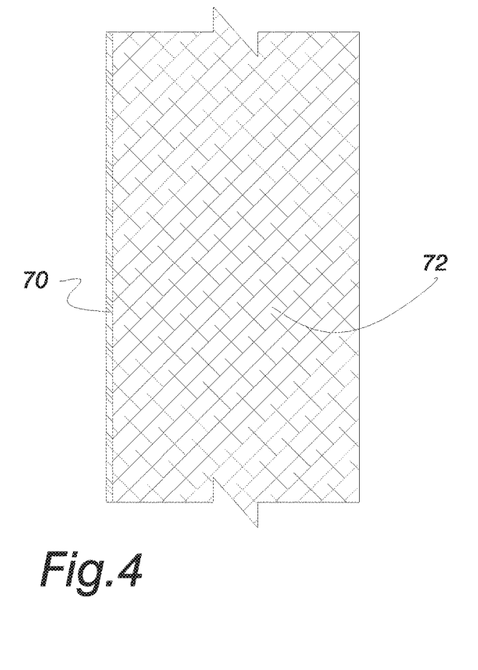
FIG. 4 is schematic side sectional view of composite sheet material constructed in accordance with a preferred embodiment of the invention to illustrate the relative thickness of the thin filter layer as compared to the thickness of its porous, non-filtering support layer.

Disclosed in FIGS. 4-7, along with the following description, are the layers making up the composite sheet material of this invention which comprises a thin filter layer 70 bonded to a porous, non-filtering substrate layer 72. FIG. 4 is schematic to illustrate the relative thickness of the thin filter layer 70 as compared to its support layer 72.

Figure 5:
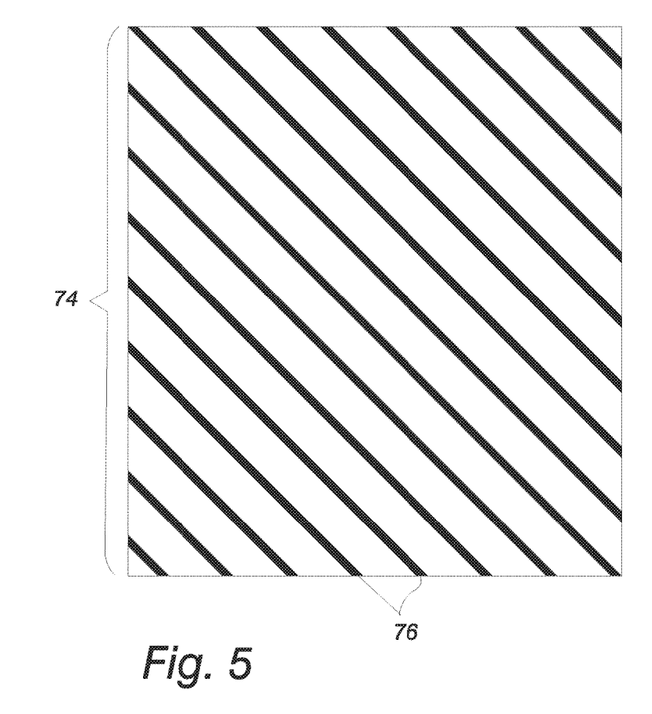
FIG. 5 is a front view of a portion of the obverse side of the substrate layer of the composite sheet material constructed in accordance with a preferred embodiment of the invention where the substrate layer has been imprinted with a first pattern of spaced apart, parallel lines of conductive ink in a direction running generally from right to left.
Figure 6:
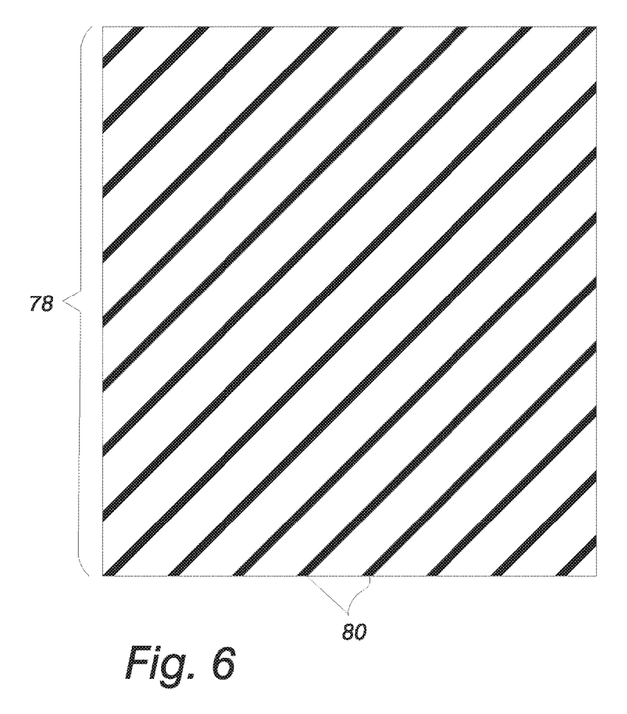
FIG. 6 is a rear view of a portion of the reverse side of the substrate layer as shown in FIG. 5 having been imprinted with a second pattern of spaced apart, parallel lines of conductive ink in a direction running generally from left to right.

Before the filter layer 70 can be bonded to its substrate layer 72, however, the substrate layer 72 is prepared in the manner to be described. Illustrated in FIG. 5 is a sheet of the porous, non-filtering substrate layer 72 on which the obverse side shown is imprinted with a first pattern 74 of spaced apart, parallel lines 76 of conductive ink which penetrate over 50%, but less than 75%, of the thickness of the substrate layer 72. The reverse side of the substrate 72, as shown in FIG. 6, is imprinted with a second pattern 78 of spaced apart, parallel lines 80 of conductive ink which penetrate over 50%, but less than 75%, of the thickness of the substrate layer 72. Thus the respective lines 76 & 80 of the first and second patterns 74 & 78 meet at intersections within the substrate layer 72 to provide a series of continuous, uninterrupted electrostatic discharge pathways running through the substrate layer 72 to dissipate static electricity charges.

Figure 7:
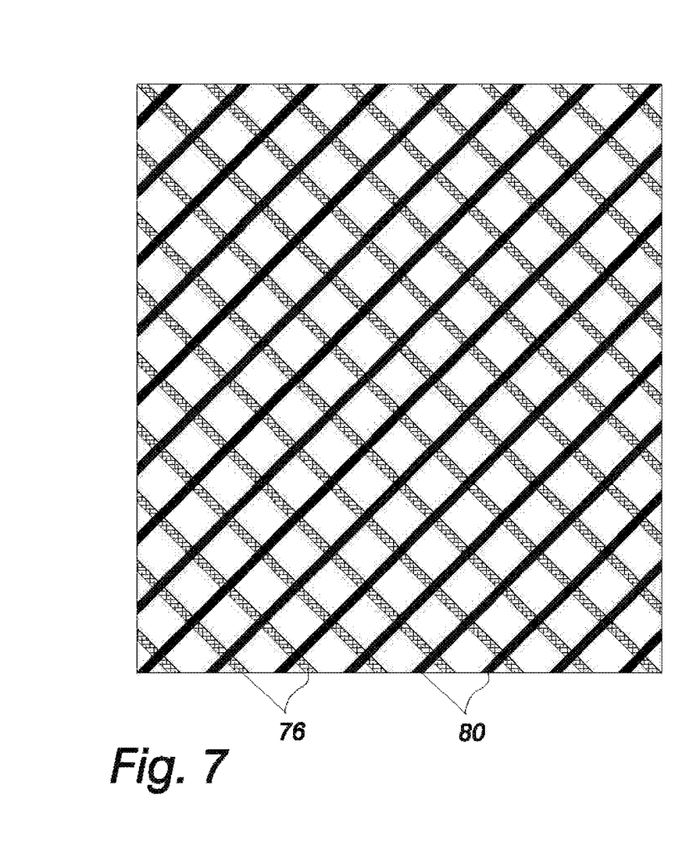
FIG. 7 is a schematic illustration of the rear view of the substrate layer shown in FIG. 6 as if the layer was held to the light such that the first pattern of lines is slightly visible as faint lines through the translucency of the substrate layer.

The substrate layer 72 is a non-woven fabric having a high porosity and air permeability making it unsuitable as a filter media for submicron sized particulates. However, it has sufficient structural integrity to serve as a support layer. Due to its high porosity and air permeability, the substrate layer 72 is slightly translucent such that when a sheet of material is held to the light the pattern of lines closest to the viewer appear black in color, or nearly so, and the pattern of lines on the opposite side of the sheet appear as faint black or gray in color. FIG. 7 attempts to illustrate this visual difference with gradations of line density.

As those skilled in the art of fabric filtration appreciate, fabric specifications for porosity and air permeability can widely vary. In the context of defining physical parameters of acceptable materials for the substrate layer 72, the Frazier Differential Pressure Air Permeability Instrument is used since it has been a standard in the filter media industry for many years. Such equipment measures the flow rate in cubic meters across an equivalent filter media area of one square meter with a differential pressure of 125 Pa (i.e., cubic feet per minute across an equivalent filter media area of one square foot with a differential pressure resistance of 0.5" of water column). A high Frazier Number, sometimes referred to as $m^3/min$ (i.e., CFM), implies a media with high porosity.

In addition to Frazier Number, "basis weight" is an additional measurement relied upon in the specification of media by the fabric filtration industry.

With the foregoing in mind, materials for the substrate layer 72 are preferably spun bond polyesters for applications in operating temperatures less than or equal to 135° C. (i.e., 275° F.). In terms of Frazier Number, values in the range of 4.57 to 24.38 $m^3/min$ (i.e., 15 to 80 CFM) are acceptable. In terms of basis weight, values in the range of 200 to 400 $g/m^2$ are acceptable with a preferred range around 265 $g/m^2 \pm 10\%$. The thickness of the substrate layer 72 can typically range from 0.5 mm to 0.7 mm.

The character of the lines 76 & 80 forming the first and second patterns 74 & 78 may be straight (as illustrated in the drawings), wavy, or simply interconnected symbols. It is important that the lines be equally spaced apart, uniform and uninterrupted in length across the substrate. Line spacing in the range of 9.53 mm to 19.05 mm (i.e., ⅜" to ¾") has produced satisfactory results. Line width in the range of 1 mm to 2 mm is acceptable.

The angle of inclination of the lines 76 & 80 on the substrate 72 may be varied considerably. As a general rule, the lines 76 on one side of the substrate 72 are oriented in the opposite direction of the lines 80 on the opposite side so as to establish the line intersections within the thickness of the substrate layer 72. In other words, it is important that the lines 76 on one side of the substrate 72 are not congruent or in registry with the lines 80 on the opposite side. For convenience of printing, it is preferable that the lines 76 of the pattern 74 on one side are oriented at an angle θ and the lines 80 of the pattern 78 on the opposite side are oriented at an angle −θ. For example, if the pattern 74 on one side is oriented at 45°, then the pattern 78 on the opposite side would be oriented in the opposite direction at −45°.

A variety of conductive coatings or inks may be applied to the substrate layer 72 to form the line patterns 74 & 78 on the sides thereof. Such conducting agents include graphite, carbon particles, intrinsically conductive polymers, metal, metal oxides, and combinations thereof. Depending upon the conductive agent chosen for imprinting the substrate layer, binding and drying agents may be included. One such useful ink contains 10 to 20% by weight graphite in an acrylic carrier as available from The Lubrizol Corporation under the product trade name PRINTRITE 9691.

The filter layer 70 is a very thin barrier applied to the substrate 72 and adapted to filter extremely fine dust of the character posing a potential explosion hazard. Typically, such sensitive particulate matter can range in the size of 0.1 to 420 microns. Suitable materials to form a thin filter barrier 70 can be in the form of films or membranes, or deposition materials typically applied in a spray process.

Suitable membranes include those having a basis weight in the range of 1.36 to 8.48 g/m$^2$ (i.e., 0.04 to 0.25 oz/yd$^2$), with a preferred range of 1.36 to 4.07 g/m$^2$ (i.e., 0.04 to 0.12 oz/yd$^2$) and a Frazier Number in the range of 2.74 to 5.03 m$^3$/min (i.e., 3 to 16.5 CFM). Typical thicknesses of such membranes normally fall in the range of 12 to 20 microns. One material particularly well suited for use as the filter layer 70 is expanded polytetafluoroethylene (ePTFE) having an air permeability (i.e., Frazier Number) in the range of 2.74 to 5.03 m$^3$/min (i.e., 3 to 16.5 CFM) at a pressure drop of 125 Pa (i.e., 0.5" H$_2$O) and a filtration efficiency in the range of 95% to 99+% when challenged with a 0.3 micron aerosol at a flow rate of 3.20 m/min (i.e., 10.5 feet/min). The ePTFE membrane may be thermally laminated to the support substrate 72 to permanently bond the two layers 70 & 72.

Suitable spray deposition materials include microfibers having a diameter size in the range of 0.2 to 10 microns, nanofibers having a diameter of <0.2 microns, or mixtures thereof, a basis weight in the range of 0.05 to 2 g/m$^2$, and a filtration efficiency in the range of 55% to 70% when challenged with a 0.3 micron aerosol at a flow rate of 3.05 m/min (i.e., 10 feet/min).

The process for making the composite sheet material of this invention first involves selecting the substrate 72 in accordance with the guidelines previously outlined. One side of the substrate 72 is imprinted with conductive ink in an appropriate first pattern 74 of parallel lines 76 and allowed to dry. The opposite side of the substrate 72 is then imprinted with a second pattern 78 of parallel lines 80 and allowed to dry. On one side or the other of the substrate layer 72 is then applied a thin filter barrier 70.

The composite sheet material so formed may be pleated and fashioned into an elongate tube with the filter layer on the outside thereof from which a filter cartridge can be manufactured using techniques well known to those skilled in the filtration arts. Characteristically, filter cartridges for use with the composite sheet material disclosed will include a metal core, a metal bottom cap bottom closing the lower end of the pleated tube, and an open, molded top to be sealed against the tube sheet of a baghouse.

Due to the difficulty in showing the first and second patterns 74 & 78 of conductive ink after the material has been pleated, FIGS. 8-13 are photographs of filter cartridges made with the conductive sheet material. It will be understood that such filter cartridges have a metal core, preferably a metal bottom cap joined to the metal core.

Figure 8:
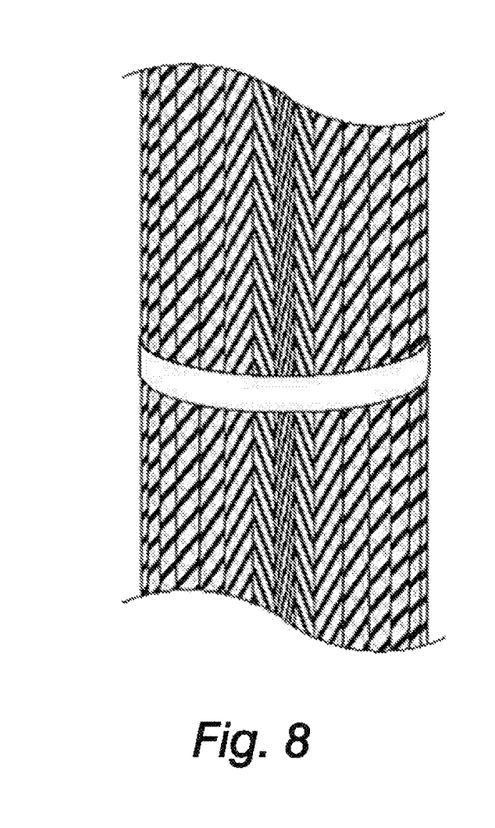
FIG. 8 is a photograph of a portion of the composite sheet material after applying the thin filter layer and after having been pleated and formed into a tube for construction of a baghouse filter cartridge.

FIG. 8 is a photograph of a portion of the composite sheet material after having been pleated and formed into a tube. The outermost surface of the tube is the thin filter layer 70 which is substantially translucent. The darker lines of pattern 74 are on the obverse side of the substrate layer 72 and the lighter lines of pattern 78 are still faintly visible through the thickness of the substrate 72.

Figure 9:
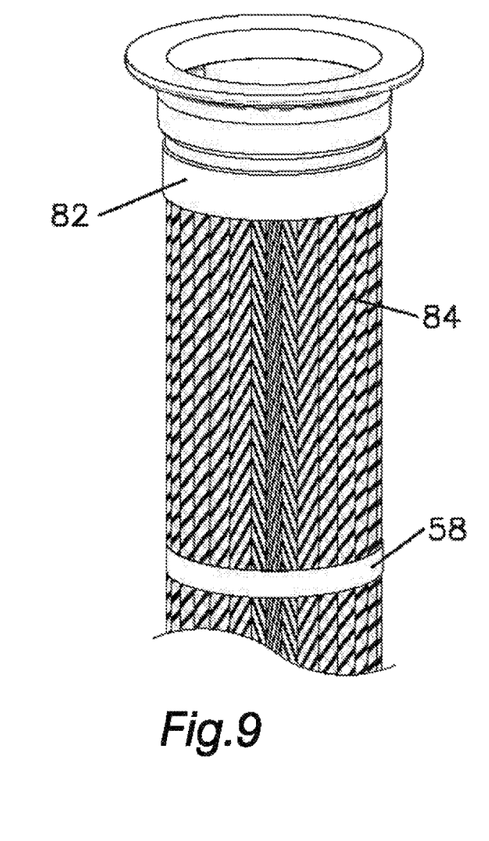
FIG. 9 is a photograph of the upper end of a filter cartridge having a metal core and a molded top of conductive rubber for a top load baghouse.

FIG. 9 shows one example of a top load filter cartridge for grounding the substrate layer 72 to the metal tube sheet of the baghouse. The upper end of the filter cartridge has a top 82 of conductive rubber (i.e., a rubber molding compound containing graphite). The top 82 contacts the pleated tube 84 and the metal core (not shown) and, when installed in the baghouse, also seals against the opening in the metal tube sheet of the baghouse to ground the filter cartridge.

Figure 10:
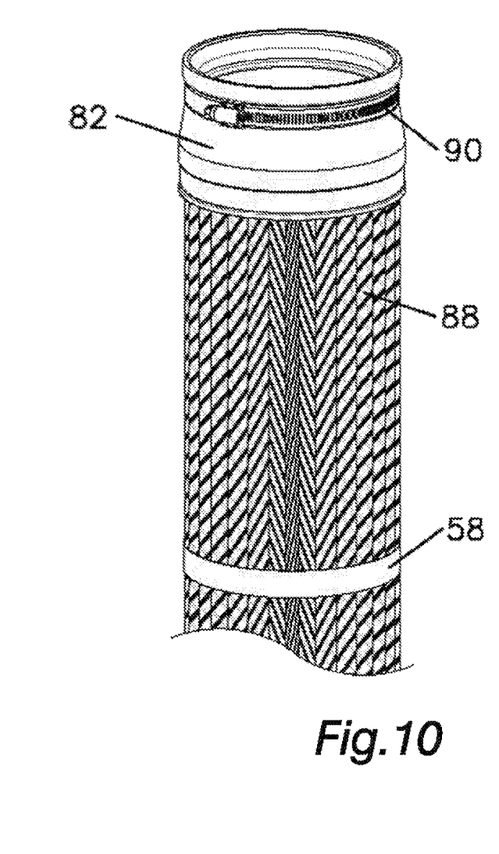
FIG. 10 is a photograph of the upper end of a filter cartridge having a metal core and a molded top of conductive rubber for a bottom load baghouse.

FIG. 10 shows an example of a bottom load filter cartridge for grounding the substrate layer 72 to the metal tube sheet of the baghouse. The upper end of the filter cartridge has a sleeve 86 of conductive rubber. The sleeve 86 contacts the pleated tube 88 and the metal core (not shown) and, when installed in the baghouse, fits over a metal tube secured to the lower surface of the tube sheet and is held in place by a clamping band 90 to ground the filter cartridge to the tube sheet of the baghouse.

Figure 11:
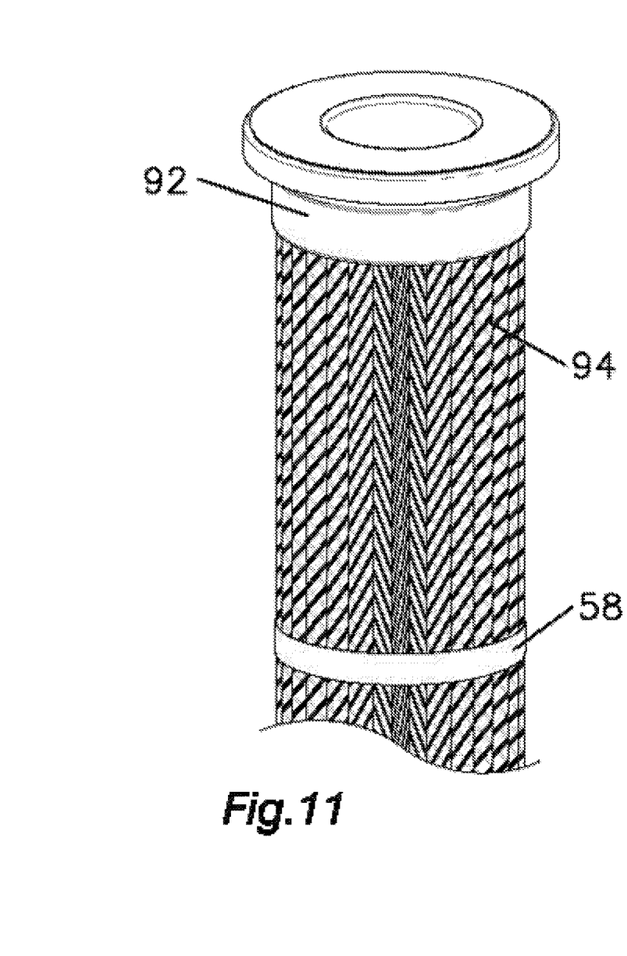
FIG. 11 is a photograph of the upper end of a filter cartridge having a metal core and a metal top for a top load baghouse.

FIG. 11 shows another example of a top load filter cartridge for grounding the substrate layer 72 to the metal tube sheet of the baghouse. The upper end of the filter cartridge has a metal top 92 which contacts the pleated tube 94 and the metal core (not shown) and, when installed in the baghouse, also contacts the metal tube sheet of the baghouse to ground the filter cartridge.

Figure 12:
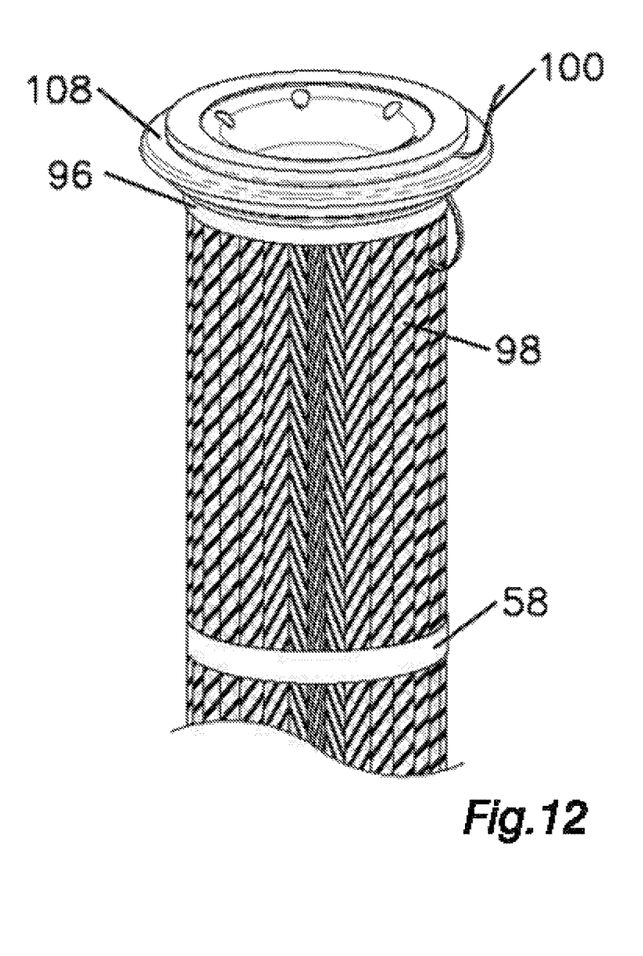
FIG. 12 is a photograph of the upper end of a filter cartridge having a metal core, a molded top of nonconductive material, a sealing gasket of conductive rubber, and a grounding wire connected to the core for grounding to the tub sheet of a top load baghouse.

FIG. 12 shows an example of a top load filter cartridge for grounding the substrate layer 72 to the metal tube sheet of the baghouse. The upper end of the filter cartridge has a molded top 96 of nonconductive material which contacts the pleated tube 98 and the metal core (not shown). Since the top 96 is nonconductive, it is necessary to include a ground wire 100 which interconnects the metal core with the metal tube sheet of the baghouse to ground the filter cartridge. The molded top 96 fits within a gasket 108 of conductive rubber to seal against the tube sheet.

Figure 13:
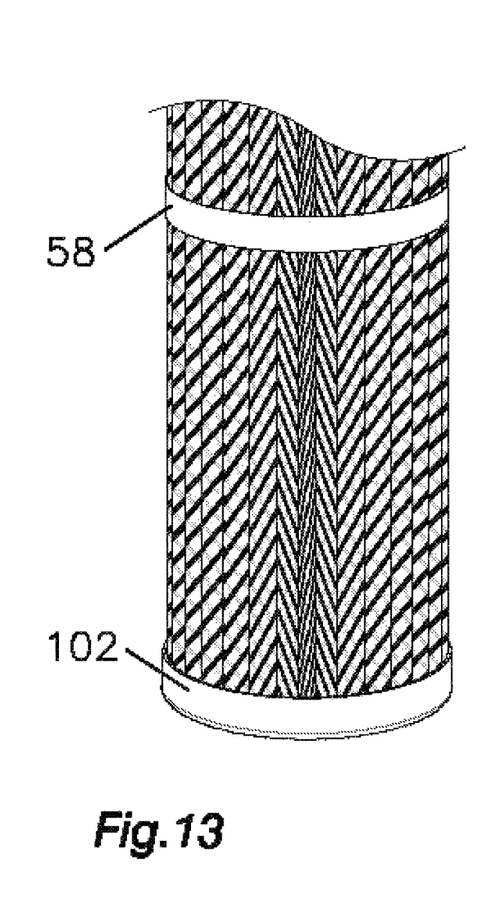
FIG. 13 is a photograph of a metal bottom end cap attached to the metal core of the filter cartridge.

FIG. 13 illustrates a typical way of closing the lower end of the filter cartridges as shown in FIGS. 9-12. A metal end cap 102 is attached to the metal core of the filter cartridge in order to ground the lower end back to the tube sheet of the baghouse.

Figure 14:
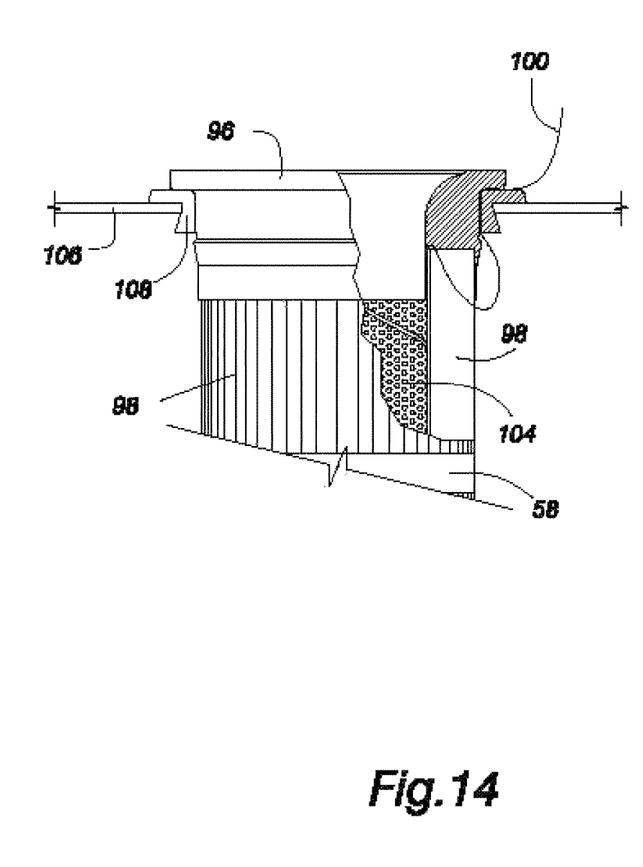
FIG. 14 is a fragmentary side elevational view of the filter cartridge of FIG. 12 with a metal core and grounding wire for a top load baghouse.

FIG. 14 is a drawing showing the internal details of the filter cartridge as pictured in FIG. 12 having a metallic core 104. It is to be understood that the pleated tube 98 will have the appearance as shown in FIG. 12. The grounding wire 100 is attached to the core 104 and, during the molding process, is threaded through the molding compound forming the top fitting 96. When the filter is installed on the tube sheet 106 of the baghouse, the grounding wire 100 is threaded between the top fitting 96 and the conductive rubber sealing gasket 108 to be connected to the tube sheet 106, or other grounding equipment of the baghouse to supply an electrical ground to the metallic core 104. This, in turn, grounds the substrate layer 72 because the conductive ink of the second pattern 78 of parallel lines 80 can engage the metal core 104 throughout its length. This provides a safe means for dissipating any static electric charge built up in the filter cartridge.

The composite sheet material as disclosed herein for a baghouse filter cartridge thus provides a non-filtering, electrostatic dissipation substrate for safely discharging static electric charges combined with an unobstructed, thin filter surface for capturing fine dusts.

From the foregoing it will be seen that this invention is one well adapted to attain all the ends and objects hereinabove set forth, together with the other advantages which are obvious and which are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described my invention, I claim:

1. Sheet material for making high efficiency air filters with electrostatic dissipation properties, said sheet material comprising:

an unobstructed, thin barrier filter layer for removing particulate matter from a particulate laden gas stream, said filter layer having a top edge and a bottom edge;

a non-filtering porous support layer bonded to said filter layer, said support layer having a top edge corresponding to said top edge of said filter layer, having a bottom edge corresponding to said bottom edge of said filter layer, and having a thickness substantially greater than said filter layer; and a plurality of continuous, uninterrupted electrostatic discharge pathways between the top and bottom edges of said support layer for dissipating static electricity charges through said sheet material; said electrostatic discharge pathways further comprising:

a first series of uninterrupted, equally spaced apart parallel lines of electrostatic conductive ink forming a first pattern imprinted on one side of said support layer and penetrating more than one half said thickness of said support layer;

a second series of uninterrupted, equally spaced apart parallel lines of electrostatic conductive ink forming a second pattern imprinted on the opposite side of said support layer and penetrating more than one half said thickness of said support layer; and a plurality of intersections within said support layer where said first series of parallel lines of said conductive ink penetrating more than one half said thickness of said support layer intersect said second series of parallel lines of said conductive ink penetrating more than one half said thickness of said support layer;

wherein said first and second patterns of conductive ink are out of register with one another such that any electrostatic discharge pathway may dissipate a static electric charge from one line in said first pattern to one line in said second pattern by travel through the said intersection between said lines.

2. The sheet material as in claim 1, wherein the spacing of said parallel lines of said first and second patterns falls within the range of 9.53 mm to 19.05 mm.

3. The sheet material as in claim 1, wherein said lines of said first pattern are oriented in a first direction on an obverse side of said support layer and said lines of said second pattern are oriented in a second direction on the reverse side of said support layer opposite said first direction.

4. The sheet material as in claim 1, wherein said lines of said first pattern are oriented at an angle $\theta$ on one side of said support layer and said lines of said second pattern are oriented at an angle $-\theta$ on opposite side of said support layer.

5. The sheet material as in claim 1, said thin barrier filter layer comprising a membrane having a basis weight in the range of 1.36 to 8.48 $g/m^2$, and a Frazier Number in the range of 2.74 to 5.03 $m^3/min$.

6. The sheet material as in claim 5, said membrane preferably having a basis weight in the range of 1.36 to 4.07 $g/m^2$, and a filtration efficiency in the range of 95% to 99+% when challenged with a 0.3 micron aerosol at a flow rate of 3.20 m/min.

7. The sheet material as in claim 6, said membrane is an ePTFE material (ePTFE) having a Frazier Number in the range of 2.74 to 5.03 $m^3/min$ at a pressure drop of 125 Pa.

8. The sheet material as in claim 1, said thin barrier filter layer comprising a spray deposition material selected from the group consisting of microfibers having a diameter size in the range of 0.2 to 10 microns, nanofibers having a diameter of <0.2 microns, or mixtures thereof, a basis weight in the range of 0.05 to 2 $g/m^2$, and a filtration efficiency in the range of 55% to 70% when challenged with a 0.3 micron aerosol at a flow velocity of 3.05 m/min.

9. The sheet material as in claim 1, said support layer having a basis weight in the range of 200 to 400 $g/m^2$ and a Frazier Number in the range of 4.57 to 24.38 $m^3/min$ at a pressure drop of 125 Pa.

10. The sheet material as in claim 9, said support layer having a preferred basis weight in the range of 265 $g/m^2$±10%.

11. The sheet material as in claim 1, said conductive ink selected from the group consisting of graphite, carbon particles, conductive polymers, metal, metal oxides, and combinations thereof.

12. The sheet material as in claim 1, said conductive ink comprising 10 to 20% by weight graphite in an acrylic carrier.

13. A filter cartridge with electrostatic dissipation properties for installation in a baghouse having a metal tube sheet with an opening to receive said filter cartridge, said filter cartridge comprising:

an elongate tube having an upper end and a lower end, said tube being formed by composite sheet material having an outer, unobstructed, thin barrier filter layer for removing particulate matter from a particulate laden gas stream, said filter layer having a top edge and a bottom edge, an inner, non-filtering porous support layer applied to said filter layer, said support layer having a top edge corresponding to said top edge of said filter layer, having a bottom edge corresponding to said bottom edge of said filter layer, and having a thickness substantially greater than said filter layer, and a plurality of continuous, uninterrupted electrostatic discharge pathways between the top and bottom edges of said support layer for dissipating static electricity charges through said sheet material, said electrostatic discharge pathways further comprising:

a first series of uninterrupted, equally spaced apart parallel lines of electrostatic conductive ink forming a first pattern imprinted on one side of said support layer and penetrating more than one half said thickness of said support layer;

a second series of uninterrupted, equally spaced apart parallel lines of electrostatic conductive ink forming a second pattern imprinted on the opposite side of said support layer and penetrating more than one half said thickness of said support; and a plurality of intersections within said support layer where said first series of parallel lines of said conductive ink penetrating more than one half said thickness of said support layer intersect said second series of parallel lines of said conductive ink penetrating more than one half said thickness of said support layer;

wherein said first and second patterns of conductive ink are out of register with one another such that any electrostatic discharge pathway may dissipate a static electric charge from one line in said first pattern to one line in said second pattern by travel through said intersection between said lines;

a core having an upper end and a lower end and being positioned within said elongate tube;

a bottom end cap sealably closing the lower end of said elongate tube;

an open mouthed, upper end member for engaging said upper ends of said elongate tube and core and sealing with said opening in said metal tube sheet of said baghouse; and an electrical grounding connection interconnecting said support layer of said elongate tube with said metal tube sheet of said baghouse for dissipating static electricity charges.

14. The filter cartridge as in claim 13, wherein said lines of said first pattern are oriented in a first direction on an obverse side of said support layer and said lines of said second pattern are oriented in a second direction on the reverse side of said support layer opposite said first direction.

15. The filter cartridge as in claim 13, said filter layer comprising a membrane having a basis weight in the range of 1.36 to 4.07 g/m$^2$, and a Frazier Number in the range of 2.74 to 5.03 m$^3$/min.

16. The filter cartridge as in claim 13, said support layer having a basis weight in the range of 200 to 400 g/m$^2$ and a Frazier Number in the range of 4.57 to 24.38 m$^3$/min at a pressure drop of 125 Pa.

17. The filter cartridge as in claim 13, said conductive ink comprising 10 to 20% by weight graphite in an acrylic carrier.

\* \* \* \* \*